UNITED STATES PATENT OFFICE.

ANDRE BROCHET, OF PARIS, FRANCE.

MANUFACTURE OF LEUCO DERIVATIVES OF VAT DYESTUFFS.

1,247,927.      Specification of Letters Patent.      Patented Nov. 27, 1917.

No Drawing.      Application filed September 25, 1914. Serial No. 863,458.

*To all whom it may concern:*

Be it known that I, ANDRE BROCHET, a citizen of the French Republic, and residing at No. 4 Rue du Banquier, Paris, France, have invented certain new and useful Improvements in the Manufacture of Leuco Derivatives of Vat Dyestuffs, of which the following is a specification.

The great development in recent years in the use of vat dye-stuffs has drawn attention to the preparation of their leuco-derivatives, in which form these dye-stuffs are rendered soluble and can alone be utilized.

The present invention has for its object a process of manufacture of these leuco-derivatives characterized by the use of gaseous hydrogen, as a reducing agent, in the presence of hydrogenizing catalyzers such as the rare metals:—platinum, palladium, &c., employed in the form of platinum black, palladium black, etc., colloidal metal or the like or comomn metals, such as nickel, cobalt, iron, copper, &c., with a greater or less admixture of suboxids, and derived from the reduction by means of hydrogen, of oxides produced by the calcination of nitrates, carbonates, hydrated oxids, organic salts &c.

All these various metals may be used either as such alone or mixed, or deposited on a support, such as pumice, infusorial earth, &c.

The improved process forming the subject of the invention, consists in bringing together the dye-stuff in suspension (or it may be in solution) in water to which there has been added an alkali:—such as potash, soda, lime, carbonate of soda, &c., and if desired an inorganic salt, such as a chlorid, sulfite, of an alkali or of an alkali earth metal, and the catalyzer, and in then causing hydrogen (or a gaseous mixture containing hydrogen and acting the same as hydrogen) to act while the mixture is violently agitated.

The reaction takes place generally at ordinary temperature, but in the majority of cases, it is advisable to accelerate the reaction by operating upon the liquid while the latter is in a heated condition.

The reaction takes place at ordinary pressure, but can likewise be accelerated by increasing the pressure of the hydrogen in the apparatus.

When the reaction is completed, the liquid containing the leuco-derivative is separated out by decantation or filtration in the actual apparatus. The latter receives a fresh charge, and the operation may be begun anew with the use of the same catalyzer.

The reduction of the dye-stuff may also be effected without the use of an alkali, but generally the reaction does not take place so well.

It is preferable, in my process, to produce mother-liquors which can be diluted immediately before use, or be treated by evaporation under reduced pressure or by any other means to obtain concentrated products for sale.

The process may be carried into effect by bubbling the hydrogen through the mixture above described, at atmospheric pressure but the hydrogen is most efficiently utilized, when the mixture is vigorously agitated, and the gas introduced under higher pressure.

Several pieces of apparatus may be connected in series, and the gas and the liquid containing the catalyzer may be caused to travel in opposite directions through them.

The improved process has the advantage of being easily applicable with gaseous mixtures containing hydrogen, for instance, water-gas.

The improved process has over the processes at present in use, the advantage of allowing of the economical production of concentrated solutions of leuco-derivatives free from impurities and mineral salts, except those which have been added purposely.

The following is a description by way of example of the manner in which the reduction of indigo can be effected:—

20 grams of synthetic indigo and 10 grams of reduced nickel are mixed with 1 liter of water containing 10 to 20 grams of caustic soda, at a temperature of about 60 to 80° C.

The agitating apparatus containing the mixture is connected to an apparatus capable of supplying hydrogen and after displacement of the air, it will be found that the hydrogen is rapidly absorbed under the influence of the agitation.

The indigo white which is formed, enters into solution. When the reduction is completed, the nickel is allowed to settle, and the brownish yellow liquid is drawn off and is ready for use.

The improved process is applicable in the same way as indigo, to thio-indigo and to derivatives of indigo and thio-indigo, to vat dye-stuffs such as indanthrenes, &c., and generally to dye-stuffs yielding leuco-derivatives under the action of reducing agents (such as hydrosulfite, mixture of lime and ferrous sulfate, &c.).

Instead of nickel there may also be employed other catalytic metals which act with different degrees of effectiveness. It is to be understod that the speed of the reaction depends on the proportion of catalyzer used.

Having now described my invention, what I claim as new and desire to secure by Letters Patent is:—

1. A process of producing leuco-derivatives of vat dye-stuffs, which comprises subjecting vat dye-stuffs in a suitable aqueous vehicle, to the action of a gas containing hydrogen, in the presence of a hydrogenating catalyst, as set forth.

2. A process of producing leuco-derivatives of vat dye-stuffs, which comprises exposing the vat dye-stuffs, in an aqueous vehicle, to the action of a gas containing free hydrogen, in the presence of metallic hydrogenating catalyst, as set forth.

3. A process of producing leuco-derivatives of vat dye-stuffs which comprises suspending the vat dye-stuffs in a vehicle comprising water, and subjecting the same to the action of hydrogen gas, in the presence of a metallic hydrogenating catalyst, while violently agitating the liquid, as set forth.

4. A process of producing leuco-derivatives of vat dye-stuffs, which comprises producing a suspension of the vat dye-stuffs in an aqueous solution of an alkali, and violently agitating the suspension, while treating the same with a gas containing hydrogen in the presence of a metallic hydrogenating catalyst.

5. A process of producing leuco-derivatives of vat dye-stuffs, which comprises suspending the dye-stuffs in an aqueous solution containing an alkali and a metal halid, subjecting the suspension to intimate contact with a gas containing hydrogen, in the presence of a metallic hydrogenating catalyst, as set forth.

6. A process of producing leuco-derivatives of vat dye-stuffs which comprises exposing the vat dye-stuffs in a liquid comprising a warm aqueous solution of an alkali, to the action of a gas containing hydrogen, in the presence of a hydrogenating catalyst, as set forth.

7. A process of producing indigo-white which comprises suspending indigo and metallic nickel, in a warm solution of caustic alkali, and exposing the same to intimate contact with a gas containing hydrogen, as set forth.

In testimony whereof I have signed my name to this specification in the presence of two subscribing witnesses.

ANDRE BROCHET.

Witnesses:
 DE WITT C. POOLE, Jr.,
 L. PAILLARD.